United States Patent [19]

McClellan

[11] Patent Number: 5,385,953
[45] Date of Patent: Jan. 31, 1995

[54] MICROCELLULAR POLYURETHANE COMPOSITE

[75] Inventor: Thomas R. McClellan, Mission Viejo, Calif.

[73] Assignee: Urethane Technologies, Inc., Santa Ana, Calif.

[21] Appl. No.: 138,759

[22] Filed: Oct. 18, 1993

Related U.S. Application Data

[63] Continuation-in-part of Ser. No. 771,308, Oct. 2, 1991, Pat. No. 5,254,405.

[51] Int. Cl.$^6$ .......................... B32B 5/22; B60C 5/01; C08L 75/00
[52] U.S. Cl. ...................... 521/109.1; 152/452; 428/315.5; 428/317.9; 428/327; 428/328; 428/330; 428/331; 428/423.9; 521/128; 521/131; 521/137; 524/507; 525/130
[58] Field of Search .......................... 36/25 R, 43, 44; 152/210, 452; 428/327, 330, 331, 328, 315.5, 317.9, 423.9; 521/109.1, 128, 131, 137; 524/507; 525/130

[56] References Cited

U.S. PATENT DOCUMENTS

| | | | |
|---|---|---|---|
| 3,896,059 | 7/1975 | Wakefield et al. | 260/2.3 |
| 3,980,595 | 9/1976 | Schonfeld et al. | 260/3 |
| 4,112,176 | 9/1978 | Bailey | 428/304 |
| 4,113,186 | 9/1978 | Smith | 241/24 |
| 4,363,450 | 12/1982 | Schmidt | 241/24 |
| 4,452,920 | 6/1984 | Joubert | 521/109.1 |
| 4,505,984 | 3/1985 | Stelzer et al. | 428/424.7 |
| 4,511,626 | 4/1985 | Schumacher | 428/425.6 |
| 4,850,596 | 7/1989 | Olund | 273/408 |
| 4,863,106 | 9/1989 | Perkel | 241/5 |

*Primary Examiner*—D. S. Nakarani
*Attorney, Agent, or Firm*—Poms, Smith, Lande & Rose

[57] ABSTRACT

A microcellular polyurethane composite material comprising desiccated rubber particles embedded in a microcellular matrix of polyurethane. Rubber particles derived from tires and other sources are combined with a desiccant to remove moisture present in the particles. The resulting desiccated rubber particles and desiccant are mixed with a polyol, polyisocyanate, catalyst, and blowing agent to form a precursor blend which is cured to produce a microcellular polyurethane composite. The resulting microcellular rubber-polyurethane composite may be used for tires, shoe and boot soles, surface coatings, and other applications requiring a material which is structurally strong and wear resistant. The desiccated rubber particles may be premixed with the polyol and/or added simultaneously with the polyol, polyisocyanate, catalyst, and blowing agent during composite molding.

25 Claims, No Drawings

MICROCELLULAR POLYURETHANE COMPOSITE

REFERENCE TO RELATED APPLICATION

This application is a continuation-in-part of prior U.S. application Ser. No. 07/771,308, filed Oct. 2, 1991, now U.S. Pat. No. 5,254,405.

BACKGROUND OF THE INVENTION

1. Field of the Invention

The present invention relates generally to the recycling of rubber products. More particularly, the present invention relates to methods and compositions wherein comminuted scrap rubber is incorporated into a polyurethane matrix to form a wide variety of useful materials and products.

2. Description of Related Art

The recycling of rubber products has received a great deal of attention in recent years. Typical rubber recycling processes involve grinding or otherwise comminuting scrap rubber product to form rubber particles. These rubber particles are recycled by mixing them with various different binders and molding or otherwise fabricating the rubber-binder mixture into desired articles. Typical uses for recycled rubber particles include the formation of various underlayments, surface coatings, tires, and other articles where a strong and resilient material is required. The binders which have been used to form the composites of recycled rubber particles include asphalt, synthetic and natural rubber, epoxies, and polyurethanes.

The majority of rubber recycling effort has been directed toward automobile and truck tires. The extremely large quantity of automobile and truck tires which is discarded each year requires that some degree of recycling occur. Processes used to recycle automobile and truck tires must necessarily be well suited for handling large quantities of recycled material. The process must be capable of taking large quantities of rubber particles directly from tire grinding and shredding equipment and transforming the particles into a useful material which can be molded or shaped into desired finished products.

Polyurethanes are popular binders which have been used to form composites with recycled rubber particles. A common procedure for forming a polyurethane involves mixing a polyisocyanate with a polyol and suitable catalyst. The resulting polyurethane will be a noncellular material provided that a blowing agent is not present in the composition. Addition of a blowing agent causes the polyurethane to foam, resulting in a microcellular polyurethane material. Water, if present, can function as a blowing agent during polyurethane formation because the carbon dioxide generated by the reaction of water and isocyanate becomes trapped within the polyurethane matrix and produces a foam structure.

Polyurethane composite materials wherein recycled rubber particles are incorporated into a polyurethane are well suited for use in tires, shoe and boot soles, mattings, and other applications where a high degree of strength and wear resistance are required. However, recycled rubber particles may contain sufficient moisture to produce an excess of foaming, resulting in composites which are softer than desired.

An object of the present invention, therefore, is to provide a process in which rubber tires and other discarded rubber products can be incorporated into a polyurethane matrix in a simple and efficient manner to provide a polyurethane composite material which has adequate functional properties including high strength and wear resistance.

Another object of this invention is to control the extent of foaming in the production of polyurethane-rubber composites.

SUMMARY OF THE INVENTION

In accordance with the present invention, a process is provided for taking recycled rubber particles and incorporating them into a polyurethane matrix to form a polyurethane composite material. The present invention is based in part upon the discovery that the recycled rubber particles must be desiccated prior to mixing with the polyurethane precursors to prevent uncontrolled foaming and the resultant formation of a cellular matrix lacking in the desired properties. It was discovered that the amount of moisture typically present in recycled rubber particles is sufficient to cause uncontrolled and excessive foaming during formation of polyurethane composite materials. This foaming produces a nonuniform product which includes undesirable areas of softer foam.

The materials produced in accordance with the present invention are polyurethane composites which contain from 1 to 40 weight percent of desiccated rubber particles which are embedded in a microcellular matrix of polyurethane. The microcellular composite material is structurally strong and is wear resistant. It is well suited for use in making tires, shoe and boot soles, and paddings, and in other applications where a strong, wear resistant material is required.

As a feature of the present invention, the recycled rubber particles which contain moisture are mixed with a desiccant which desorbs substantially all of the moisture from the recycled rubber particles. Although the desiccant may be separated from the rubber particles after desorption of moisture, it was discovered that the combined mixture of desiccant and rubber can be directly mixed with the polyisocyanate-polyol raw material. The moisture remains locked within the desiccant and does not react with the isocyanate during elastomer formation to cause excessive foaming. Thereby, the extent foaming can be more easily controlled.

As another feature of the present invention, desiccated rubber particles ranging in size from one micron to about two inches are incorporated in a microcellular polyurethane matrix to provide a wide variety of composites which can be molded into numerous different articles. The larger particles may be used in molding larger items, such as truck tires, while the smaller particles can be used to fabricate smaller items, such as shoe and boot soles.

As a further feature of the present invention, the rubber particles to be recycled may include up to about 5 weight percent of tire reinforcing material, such as metal, nylon or other belt materials typically used to reinforce automobile and truck tires. This feature allows recycling of tires without the need to separate metal and other belt materials from the rubber particles. Additionally, the desiccated rubber particles may be premixed with the polyol component or they can be mixed simultaneously in the mold with the other components which result in the formation of the polyurethane. Any of the three procedures provides uniform dispersion of the rubber particles throughout the microcellular polyurethane matrix.

The above-described and many other features and attendant advantages of the present invention will become better understood by reference to the following detailed description.

DETAILED DESCRIPTION OF THE INVENTION

The present invention has wide application to the recycling of rubber based products. The following detailed description will be limited to using rubber particles derived from automobile and truck tires as the source of recycled rubber. However, it will be understood by those skilled in the art that rubber particles derived from virtually any rubber based product may be used.

The polyurethane composite material in accordance with the present invention includes from 1 to 40 weight percent of desiccated rubber particles which are embedded in a microcellular matrix of polyurethane. The desiccated rubber particles have a particle size which is preferably in the range of 1 micron to about 2 inches. The particles may be substantially uniform in particle size or the particles may cover a range of sizes. Rubber particle sizes in the range of 100 microns to 1 inch are particularly preferred. Rubber particles within this size range are especially well suited for making solid rubber tires and other items where a combination of good strength and wear resistance is required.

The rubber particles may be formed by any of the known grinding or comminuting processes presently used to recycle automobile and truck tires. The tire grinding equipment will not be described in detail, since the actual procedures for grinding or comminuting automobile tires or other scrap rubber does not form part of the invention. However, such equipment is necessary in order to produce large quantities of rubber particles for incorporation into the microcellular polyurethane matrix of the present invention. The use of tire grinding equipment to comminute tires and other scrap rubber is widely known.

In accordance with the present invention, it is not necessary to separate the metal, rayon, polyester, aramide, polyamide-imide, nylon or other tire belting material from the rubber tire particles. This is advantageous when recycling large numbers of tires. Such tire belting particles may be incorporated directly into the polyurethane matrix along with the rubber particles, provided that the amount of belting material does not exceed about 5 weight percent. The amount of metal or nylon belting material present in automobile tires is generally on the order of a few percent. Accordingly, the entire tire may be ground to the desired size range and recycled without separating out the metal or other belt material. Preferably, the final chopped metal or nylon cord will have lengths that are less than ¼ inch. However, the metal bead present in most automobile and truck tires is not suitable for inclusion with the rubber particle mixture and should be removed prior to comminution and recycling. Removal of the tire bead is carried out according to well-known procedures. When referring to the rubber particles to be incorporated into the polyurethane matrix, it will be understood that this mixture of particles may include up to about 5 weight percent metal, nylon, polyimide or other tire belting or cord material.

The rubber particles produced from automobile and truck tires generally will include up to 5 percent by weight absorbed moisture. This moisture can be removed by heating at elevated temperatures for periods of time on the order of a few hours to a few days. However, in accordance with the present invention, it is preferred that the moisture be removed or desorbed from the rubber particles by mixing the rubber particles with a suitable desiccant. Suitable desiccants include molecular sieves such as alkali metal alumino-silicates, calcium chloride, glycerol, silicate gel, bauxite, and the like. Molecular sieves are a preferred desiccant.

The desiccant is preferably in the form of small granules or powder having particle sizes with diameters of less than about 10 microns. The desiccant particles should be sufficiently small so that they can be intimately mixed with the rubber particles to insure efficient desorption of moisture from the rubber particles. The amount of desiccant which is added to the rubber particles should be equal to or in excess of the amount necessary to remove substantially all of the moisture from the rubber particles. Preferably the amount of desiccant added to the rubber particles will provide a rubber particle-desiccant mixture containing from about 5 weight percent to 15 weight percent desiccant. The preferred amount of desiccant in the rubber particle-desiccant mixture is about 10 weight percent. The amount of desiccant present in the final polyurethane composite is preferably between about 0.05 to 6 weight percent.

The desiccant and rubber particles are mixed together in a suitable container to insure intimate and uniform contact between the desiccant and rubber particles. The mixture is then left in a moisture free atmosphere for a sufficient time for the desiccant to desorb substantially all of the moisture from the particles. The resulting dehydrated or desiccated rubber particles should have less than 500 ppm (parts per million) water available for possible reaction with the isocyanate component and preferably less than 200 ppm water. The mixture of desiccant and rubber particles need not be maintained at an elevated temperature as dehydration will typically occur at room temperature or between 30 minutes and a few hours. The resulting desiccated rubber particles can then be used in accordance with the present invention to produce a microcellular polyurethane composite material.

It has been found, surprisingly, that premixing of the desiccant into the polyurethane raw materials (e.g. the polyol) followed by addition of the non-desiccated rubber particles to the same mixture does not provide adequate desiccation of the adsorbed water from the rubber particles. Accordingly, it is preferred that the rubber particles be desiccated prior to mixing with the polyol.

In accordance with the present invention, the desiccated rubber particles can be mixed with the polyurethane "B" Component (mixture of polyol, chain extender, catalyst and blowing agent) in the same manner as other filler materials. For example, the desiccated rubber particles are mixed with the polyol component and then this blend is combined with the polyisocyanate and cured utilizing a catalyst, according to conventional procedures. The amount of desiccated rubber particles added to the polyurethane raw materials should be sufficient to provide a final composite material containing from one to forty weight per cent of desiccated rubber particles. For items such as tires, the preferred weight percent of desiccated rubber particles is about ten to twenty weight percent.

The desiccated rubber particles in accordance with the present invention can also be incorporated as a separate filler material which is added as a second component when using the centrifugal molding apparatus and method disclosed in U.S, Pat. Nos. 4,943,223 and 4,855,096, the contents of which are hereby incorporated by reference. When using this centrifugal molding apparatus and method, the desiccated rubber particles are continuously dispensed in conjunction with the dispensing of the combined liquid polyurethane components. In this preferred manner, excellent dispersion and transportation of the desiccated polyurethane mixture to the mold cavity is achieved during the centrifugal casting process. Therefore, it is possible, using desiccated premixed rubber in the polyol component and/or added as a separate stream, to advantageously achieve an overall rubber content in the final product of forty weight percent and even higher.

The particular polyisocyanate and polyol utilized to make the microcellular polyurethane matrix is not critical. Preferred polyurethanes for tire applications are of the elastic variety, such as elastomeric materials of 20 Shore A to about 60 Shore D hardness. Polyisocyanates which may be used in accordance with the present invention include methylene diphenyl diisocyanate (MDI), toluene diisocyanate (TDI), naphthalene diisocyanate (NDI), all aliphatic and cycloaliphatic types, aliphatic/aromatic types and variants of them such as uretonimines, prepolymers, trimers, biurets and the like.

Suitable polyols include polyethers derived from propylene and ethylene oxides, 1,2-butylene oxide and tetrahydrofuran, polybutadiene and comonomers, polycarbonate polyols, polyester polyols derived from aliphatic and aromatic polyacids and glycols, polycaprolactone polyester polyols, and the like.

The catalyst can be any of the well known polyurethane catalysts typically in use. Exemplary catalysts include the organo-metallic types such as stannous octoate and dibutyltin dilaurate, including derivatives of mercury, bismuth, antimony, lead, or titanium.

Typical blowing agents include low boiling liquids such as trichlorofluoromethane (CFC 11), pentane, dichlorofluoromethane (HCFC 141b), tetrafluoroethane (HFA 134a) and, in some cases, thermoplastic microspheres encapsulating these and similar low boiling liquids and gases.

In addition to the rubber particles, a variety of other fillers may also be added to the composition. For example, conventional fillers and reinforcing agents such as aluminum trihydrate, carbon black, calcium carbonate, clay, glass, wollastonite, mica, etc. can be incorporated into the polyurethane. The amount filler may be varied depending upon the desired properties of the final product. Preferably the amount of filler should be no more than about thirty-five weight percent.

The molds used to form the microcellular polyurethane composite materials in accordance with the present invention can be any of the various molds typically used in forming polyurethane materials. Metal molds, such as steel and aluminum, may be used. In addition epoxy molds, polyester reinforced fiberglass molds, silicone rubber molds, and polyurethane molds can be utilized. Normal cycling times, temperatures and pressures generally used in forming microcellular polyurethane products are suitable. The presence substantial amounts of desiccated rubber particles in the polyurethane reaction mixture does not substantially alter the curing properties and molding parameters. Any of the known processes can be used including centrifugal and rotational molding transfer and compression molding.

The following examples illustrate the invention.

EXAMPLE 1

Eighty parts of a 4500 molecular weight polyoxypropylene triol capped with 18% ethylene oxide was blended with 20 parts of 1,4-butanediol. To this mixture was further added 0.25 parts of water, 0.5 parts of an organosilicone surfactant, 0.3 parts of dibutyltin dilaurate, 0.06 parts of an aryl mercuric catalyst, 2.68 parts of HCFC 141b blowing agent (dichlorofluoromethane supplied by Elf Atochem), and 6.0 parts of black pigment. The mixture was thoroughly blended at room temperature. In a separate container 40.60 parts of ground rubber (20–30 mesh) was mixed with 4.5 parts of molecular sieves (Type 4-A from Universal Oil Products) by tumbling 15 minutes at room temperature. Thereafter the rubber-molecular sieve mixture was added to the polyol blend described above and thoroughly blended until homogeneous. A quantity of 112.1 parts of quasi prepolymer, 18.6% free NCO, prepared from diphenylmethane diisocyanate and 2000 molecular weight polyethylenebutylene adipate, was added to the above blend and the entire mixture was thoroughly agitated for 30 seconds. The following reaction times were noted: initiation, 88 seconds; gel time, 112 seconds; rise time, 140 seconds; tack-free time, 150 seconds. The free rise density was 0.50 gms/cc. Formulation was repeated in sufficient quantity to fill a 6"×6"×½" cavity in an aluminum mold with a 50% overpacking factor based on the free rise density. The mold was preheated to 70° C. Similar reaction times to those noted above were observed. The molded sample could be easily removed in 5 minutes and had smooth surfaces and an overall density of 0.77 gms/cc. After 24 hours the surface hardness was measured at a number of locations on the sample using a Shore A durometer. Values ranged from a low of 62 to a high of 70. The foam sample was then cut and the interior surface was measured. Hardness was measured in the same way and values ranged from a low of 75 to a high of 78.

EXAMPLE 2

Example 1 was repeated except that the rubber particles were not treated with the molecular sieves. The reaction times were: cream time, 60 seconds; gel time, 108 seconds; rise time, 170 seconds; and tack-free time, 190 seconds. The free rise density was 0.30 gms/cc. Formulation was repeated as in Example 1. The molding was removed from the aluminum mold in five minutes. It was noted that the sample exhibited some sticking to the mold, and it was visually observed that the surface had several defects comprising cracks and serrated surface areas. The overall density was measured at 0.60 gms/cc. After 24 hours the surface hardness was measured in a similar manner as in Example 1 and found to range between a low value of 42 Shore A to a high value of 62 Shore A. The interior of the foam was measured at a low of 54 Shore A to a high of 60 Shore A.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A microcellular polyurethane composite material comprising from 1 to 40 wt. % of desiccant dried rubber particles having a moisture content of less than 500 ppm incorporated in a polyurethane matrix, wherein said desiccant dried rubber particles have been dried prior to adding to said polyurethane by mixing rubber particles with desiccant.

2. A microcellular polyurethane composite material according to claim 1 wherein the desiccant dried rubber particles have a particle size in the range of about one micron to about two inches.

3. A microcellular polyurethane composite material according to claim 1 wherein the desiccant dried rubber particles are made by mixing recycled rubber particles which contain absorbed moisture with a sufficient amount of a desiccant for a sufficient time to desorb substantially all of the moisture from said recycled rubber particles to form said desiccant dried rubber particles.

4. A microcellular polyurethane composite material according to claim 1 wherein said composite material comprises from 0.05 to 6 weight percent of said desiccant.

5. A microcellular polyurethane composite material according to claim 1 wherein said desiccant is an alkali metal alumino-silicate.

6. A microcellular polyurethane composite material according to claim 1 wherein said composite material is in the shape of a tire.

7. A microcellular polyurethane composite material according to claim 3 wherein said recycled rubber particles are mixed with from 5 to 15 weight percent of said desiccant.

8. A microcellular polyurethane composite material according to claim 1 wherein said polyurethane is selected from the group of polyurethanes having a hardness of between Shore A 20 and Shore D 60.

9. A microcellular polyurethane composite material according to claim 8 wherein said polyurethane has a Shore A hardness in the range of about Shore A 60 to Shore A 80.

10. A microcellular polyurethane composite material according to claim 9 wherein said rubber particles have a particle size in the range of about 1 micron to about 2 inches.

11. A microcellular polyurethane composite material according to claim 1 wherein said recycled rubber particles are made from rubber tires wherein the desiccated rubber particles include chopped metal or other tire belting material.

12. A microcellular polyurethane composite material according to claim 1 wherein said composite material is in the shape of a shoe or boot sole.

13. A method for making a microcellular polyurethane composite material comprising the steps of providing desiccated rubber particles which have a particle size in the range of about one micron to about two inches wherein said rubber particles are substantially moisture-free;

mixing said rubber particles with a polyol, a polyisocyanate, and a blowing agent; and curing the resulting polyurethane composite blend to form said microcellular polyurethane composite material.

14. A method for making a microcellular polyurethane composite material according to claim 13 wherein said desiccated rubber particles are made by mixing recycled rubber particles which contain absorbed moisture with a sufficient amount of a desiccant for a sufficient time to desorb substantially all of said moisture from said recycled rubber particles to form said desiccated rubber particles.

15. A method for making a microcellular polyurethane composite material according to claim 13 wherein said curing is provided by adding a catalyst to said polyurethane composite blend.

16. A method for making a microcellular polyurethane composite material according to claim 13 wherein said desiccated rubber particles are first mixed with said polyol to form a polyol/particulate blend and wherein said polyol/particulate blend is then mixed with the remaining ingredients.

17. A method for making a microcellular polyurethane composite material according to claim 13 wherein said desiccated rubber particles, polyol, polyisocyanate, catalyst, and blowing agent are mixed together simultaneously.

18. A method for making a microcellular polyurethane composite material according to claim 13 wherein said polyurethane composite blend is cured into the shape of a shoe or boot sole.

19. A method for making a microcellular polyurethane composite material according to claim 13 wherein up to about 35 weight percent of a filler is added to said polyurethane composite blend.

20. A method for making a microcellular polyurethane composite material according to claim 19 wherein said filler is selected from the group consisting of carbon black, aluminum trihydrate, clay, mica and glass.

21. A method for making a microcellular polyurethane composite material according to claim 13 wherein said desiccated rubber particles are made from rubber tires wherein said desiccated rubber particles include chopped metal or other tire belting material.

22. A method for making a microcellular polyurethane composite material according to claim 13 wherein said polyurethane composite blend is cured into the shape of a tire.

23. A method for making a microcellular polyurethane composite material according to claim 13 wherein said polyurethane is selected from the group of polyurethanes having a hardness of between about Shore A 20 and Shore D 60.

24. A method for making a microcellular polyurethane composite material according to claim 14 wherein said desiccant is an alkali metal alumino-silicate.

25. A method for making a microcellular polyurethane composite material according to claim 24 wherein said desiccated rubber particles include about 5 to 15 weight percent of said desiccant.

* * * * *